(12) United States Patent
Charbonnier et al.

(10) Patent No.: US 10,801,369 B2
(45) Date of Patent: Oct. 13, 2020

(54) INTERMEDIATE CASING OF A TURBINE ENGINE, PROVIDED WITH A SEALING PART AT THE ARM/SHROUD INTERFACE

(71) Applicant: SAFRAN AIRCRAFT ENGINES, Paris (FR)

(72) Inventors: Simon Pierre Claude Charbonnier, Moissy-Cramayel (FR); Patrick Jean-Louis Reghezza, Moissy-Cramayel (FR); Julien Roset, Moissy-Cramayel (FR); Yann Christophe Maurice Sarazin, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 92 days.

(21) Appl. No.: 16/306,039

(22) PCT Filed: May 18, 2017

(86) PCT No.: PCT/FR2017/051215
§ 371 (c)(1),
(2) Date: Nov. 30, 2018

(87) PCT Pub. No.: WO2017/207890
PCT Pub. Date: Dec. 7, 2017

(65) Prior Publication Data
US 2019/0211711 A1    Jul. 11, 2019

(30) Foreign Application Priority Data

May 31, 2016  (FR) ...................... 16 54918

(51) Int. Cl.
| *F01D 25/28* | (2006.01) |
| *F01D 11/00* | (2006.01) |
| *F02C 7/28* | (2006.01) |
| *F01D 5/00* | (2006.01) |
| *F01D 25/24* | (2006.01) |
| *F01D 25/16* | (2006.01) |
| *F01D 5/14* | (2006.01) |
| *F01D 9/02* | (2006.01) |

(52) U.S. Cl.
CPC ............. *F01D 25/28* (2013.01); *F01D 5/005* (2013.01); *F01D 5/143* (2013.01); *F01D 9/023* (2013.01);
(Continued)

(58) Field of Classification Search
CPC .......... F01D 25/24; F01D 25/28; F01D 25/30; F01D 5/005; F01D 5/143; F01D 9/023;
(Continued)

(56) References Cited

U.S. PATENT DOCUMENTS

| 6,343,912 B1 * | 2/2002 | Manteiga ................. F01D 9/042 |
| | | 415/138 |
| 9,816,439 B2 * | 11/2017 | Soderlund ................. F02C 7/20 |

(Continued)

FOREIGN PATENT DOCUMENTS

| FR | 2958680 A1 | 10/2011 |
| FR | 2968364 A1 | 6/2012 |

(Continued)

OTHER PUBLICATIONS

Machine Translation of FR3010154A1 (Year: 2015).*
(Continued)

*Primary Examiner* — Nathaniel E Wiehe
*Assistant Examiner* — Ryan C Clark
(74) *Attorney, Agent, or Firm* — Lathrop Gage LLP (57) ABSTRACT

An intermediate casing for a turbine engine, comprising at least one central hub and one shroud (12) which are positioned concentrically, and mutually mechanically connected by structural arms (11), with such casing comprising at least one sealing part (13) attached between the shroud (12) and a structural arm (11), with the sealing part (13) including at least one metal core and one seal.

8 Claims, 9 Drawing Sheets

(52) U.S. Cl.
CPC .......... *F01D 11/005* (2013.01); *F01D 25/162* (2013.01); *F01D 25/24* (2013.01); *F02C 7/28* (2013.01); *F05D 2230/642* (2013.01); *F05D 2230/80* (2013.01); *F05D 2240/55* (2013.01)

(58) Field of Classification Search
CPC ........ F01D 11/005; F01D 25/246; F02C 7/28; F16J 15/10; F16J 15/102; F16J 15/104; F16J 15/12; F16J 15/121; F16J 15/122; F16J 15/123; F16J 15/127; F05D 2300/611; F05D 2230/642; F05D 2260/31; F05D 2240/55; F05D 2240/90
See application file for complete search history.

(56) References Cited

U.S. PATENT DOCUMENTS

| | | | | |
|---|---|---|---|---|
| 10,443,447 | B2 * | 10/2019 | King | .............. F01D 25/162 |
| 2010/0136352 | A1 * | 6/2010 | Higashira | ................. B32B 7/12 |
| | | | | 428/462 |
| 2015/0251281 | A1 * | 9/2015 | Hebuterne | ............. B23K 9/042 |
| | | | | 219/76.14 |
| 2017/0211420 | A1 * | 7/2017 | Pommier | ................ F01D 25/30 |
| 2017/0248029 | A1 * | 8/2017 | Hafner | .................... F01D 9/041 |
| 2018/0010616 | A1 * | 1/2018 | King | ....................... F01D 25/24 |

FOREIGN PATENT DOCUMENTS

| | | | |
|---|---|---|---|
| FR | 3010154 A1 * | 3/2015 | ........... F04D 29/542 |
| FR | 3010154 A1 | 3/2015 | |
| GB | 789958 A | 1/1958 | |
| WO | WO-2009158101 A1 * | 12/2009 | ............. F16J 15/127 |
| WO | WO 2014/068222 A1 | 5/2014 | |

OTHER PUBLICATIONS

International Patent Application No. PCT/FR2017/051215, International Search Report and Written Opinion dated Aug. 31, 2017, 26 pgs. (relevance found in citations and English translation).

* cited by examiner

INTERMEDIATE CASING OF A TURBINE ENGINE, PROVIDED WITH A SEALING PART AT THE ARM/SHROUD INTERFACE

CROSS-REFERENCE TO RELATED APPLICATIONS

This application is a 35 U.S.C. § 371 filing of International Application No. PCT/FR2017/051215, filed May 18, 2017, which claims the benefit of priority to French Patent Application No. 1654918, filed May 31, 2016, each of which is incorporated herein by reference in its entirety.

The present invention generally relates to the field of turbofan engines, and more specifically to the field of intermediate casings such turbine engines are provided with. Reference can be made to patents FR 2013/3010154 and FR 2010/2968364 to illustrate the prior art relating to intermediate casings of turbine engines.

The invention relates to a sealing part provided on such intermediate casings, which makes it possible to restore the contact geometry between the arms of the casing and the shroud thereof, when the shroud concerned has been machined, which induced a loss of material at the arm/shroud interface.

The current turbojet engines, of the turbofan concept, generally include a fan casing with an intermediate casing extension, in the downstream direction.

When disassembling the shroud of the intermediate casing of these turbine engines in the maintenance workshops, corrosion can be detected on the contact areas of this part with the arms of the intermediate casing. The corroded areas have to be identified and eliminated prior to re-assembling the engine.

Eliminating corrosion increases clearance between the arms and the shroud of the intermediate casing, which affects the quality of contacts in this area and impacts the behaviour of the assembly. Such changes make the system assembly unstable when exposed to loads resulting from the loss of a fan blade.

The depth of corrosion may even be beyond limits and the shrouds of the intermediate casing are then unserviceable. This is the reason why a solution is provided by the present invention to restore the contact geometry between the shroud and the arms of the intermediate casing.

The present invention aims at making it possible to repair an intermediate casing comprising at least one central hub and one shroud which are concentrically connected by structural arms, with the shroud showing corroded areas.

For this purpose, the invention provides for an intermediate casing for a turbine engine, comprising at least one central hub and one shroud which are positioned concentrically, and mutually mechanically connected by structural arms, with such casing further comprising at least one sealing part attached between the shroud and one structural arm, with the sealing part including at least one metal core and one seal.

The sealing part makes it possible to recover the initial dimensions. It increases the coefficient of friction of the arm/shroud interface, thus enhancing the behaviour of the assembly when exposed to loads resulting from the loss of a fan blade. It also makes it possible to improve the resistance of the binding to corrosion, thanks to the seal which ensures a long-lasting sealing. Additional sealing is obtained thanks to the proper adequacy between hardness and flexibility, which makes it possible to control the deformations of the part.

Various additional features can be provided, either alone or in combination. Then, for instance:
the sealing part includes a coating above the metal core.
the coating has a coefficient of friction from 0.1 to 0.7.
the coating has a thickness from 20 to 100 μm.
the sealing part includes a coating, under the seal.
the coating has a coefficient of friction from 0.1 to 0.7.
the metal core has a thickness from 100 to 200 μm.
the metal core is made of aluminium or steel.
the seal is a lip seal or a ball seal.
the seal is an elastomer seal.
the seal has a thickness from 1.1 mm to 1.5 mm.

The invention then provides for a method for repairing an intermediate casing comprising at least one central hub and one shroud which are positioned concentrically, and mutually mechanically connected by structural arms, and with the shroud showing corroded areas, with such method being comprising the following steps:
dismounting of the shroud;
identification of the corroded areas, if any;
tracing of the profiles of the corroded areas;
cleaning of the corroded areas on the shroud;
machining of the corroded areas on a surface surrounding the whole area of contact between the shroud and the arm of the casing;
mounting of the intermediate casing and positioning of the sealing parts between the arms of the casing and the shroud, at the machined areas, with binding being provided by crushing the sealing parts between the arms and the shroud.

When re-assembling the casing, crushing the sealing part at the arm/shroud interface makes it possible to restore the contact geometry between the arms and the shroud.

Further objectives and advantages of the invention will become apparent from the following description made in reference to the appended drawings, wherein.

Figure 1:
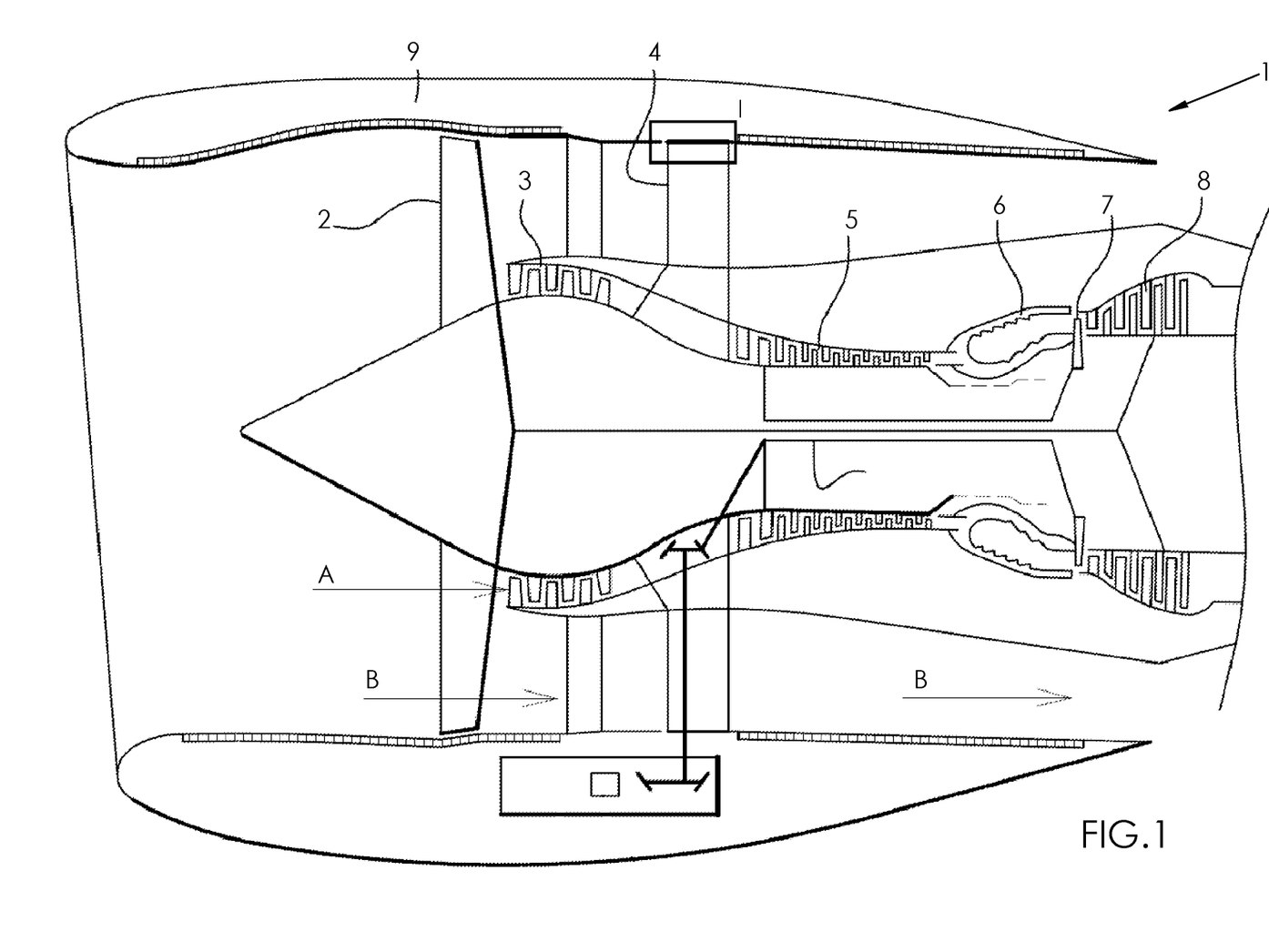
FIG. 1 schematically shows a turbofan engine with a medallion I corresponding to a zone of interest which is better visible in FIG. 2.

FIG. 1 schematically shows a turbofan engine 1. A medallion I is shown in this drawing, which locates a zone of interest, where the present invention is applied. In the downstream direction, the turbine engine 1 comprises a fan blower 2, a low pressure compressor 3, an intermediate casing 4, a high pressure compressor 5, a combustion chamber 6, a high pressure turbine 7 and a low pressure turbine 8.

The turbine engine 1 also comprises a nacelle 9. The air entering the turbine engine 1 is separated into a primary air flow (A arrow) which circulates inside the low 3 and high pressure 5 compressors towards the combustion chamber 6 and then through the high 7 and low 8 pressure turbines and into a secondary air flow (B arrow) which by-passes the compressor 3, the combustion chamber 6 and the turbine 7.

Figure 2:
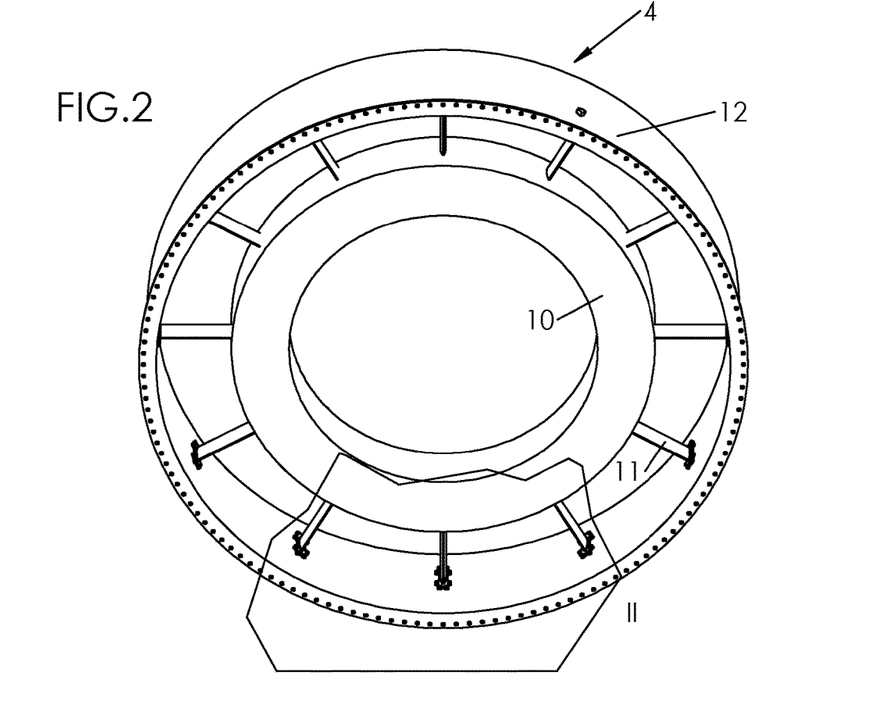
FIG. 2 is a perspective view of an intermediate casing with a medallion II corresponding to a zone of interest which is better visible in FIG. 3.

FIG. 2 is a simplified schematic view of an intermediate casing 4 provided in the turbine engine 1, which comprises a central hub 10, structural arms 11 and a shroud 12 connected to the hub through the arms 11.

Figure 3:
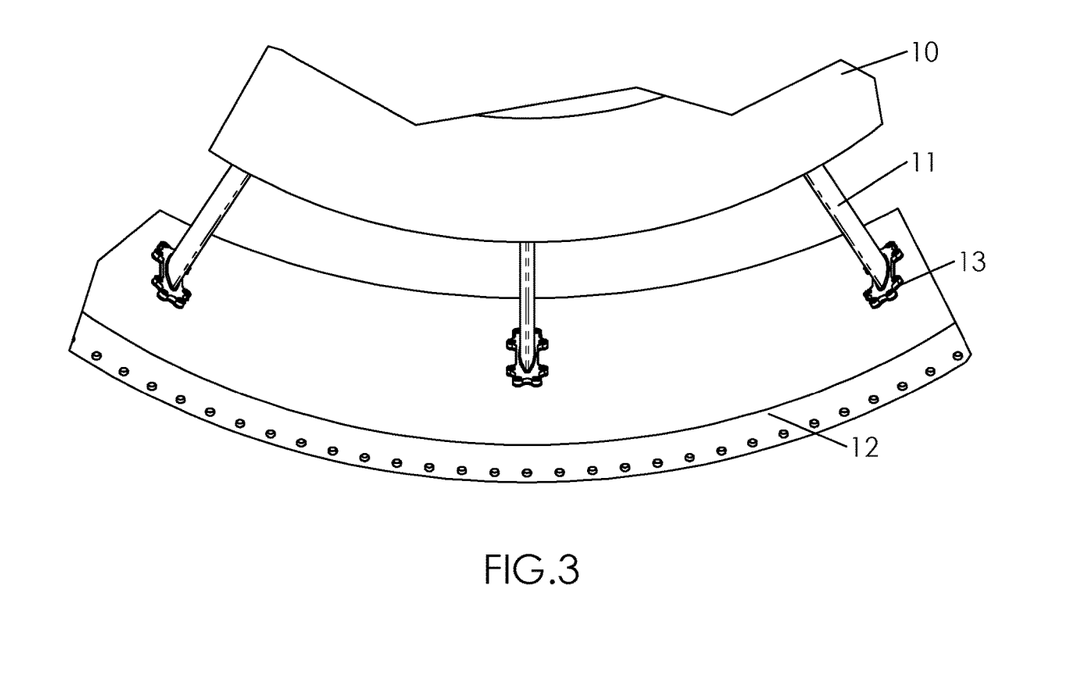
FIG. 3 is a detailed view of the zone II of FIG. 2.

FIG. 3 is a detailed view of the zone II of FIG. 2 showing three arm/shroud interfaces. The sealing part 13 is intended to be positioned between one arm 11 and one shroud 12.

In operation, the casing 4 is exposed to corrosion, which more particularly affects the arms 11 and more specifically areas 14 at the interface between, on the one hand, the arms 11 and, on the other hand, the hub and/or the shroud 12. Corrosion has to be remedied, since a propagation of same is not desirable.

Figure 4:
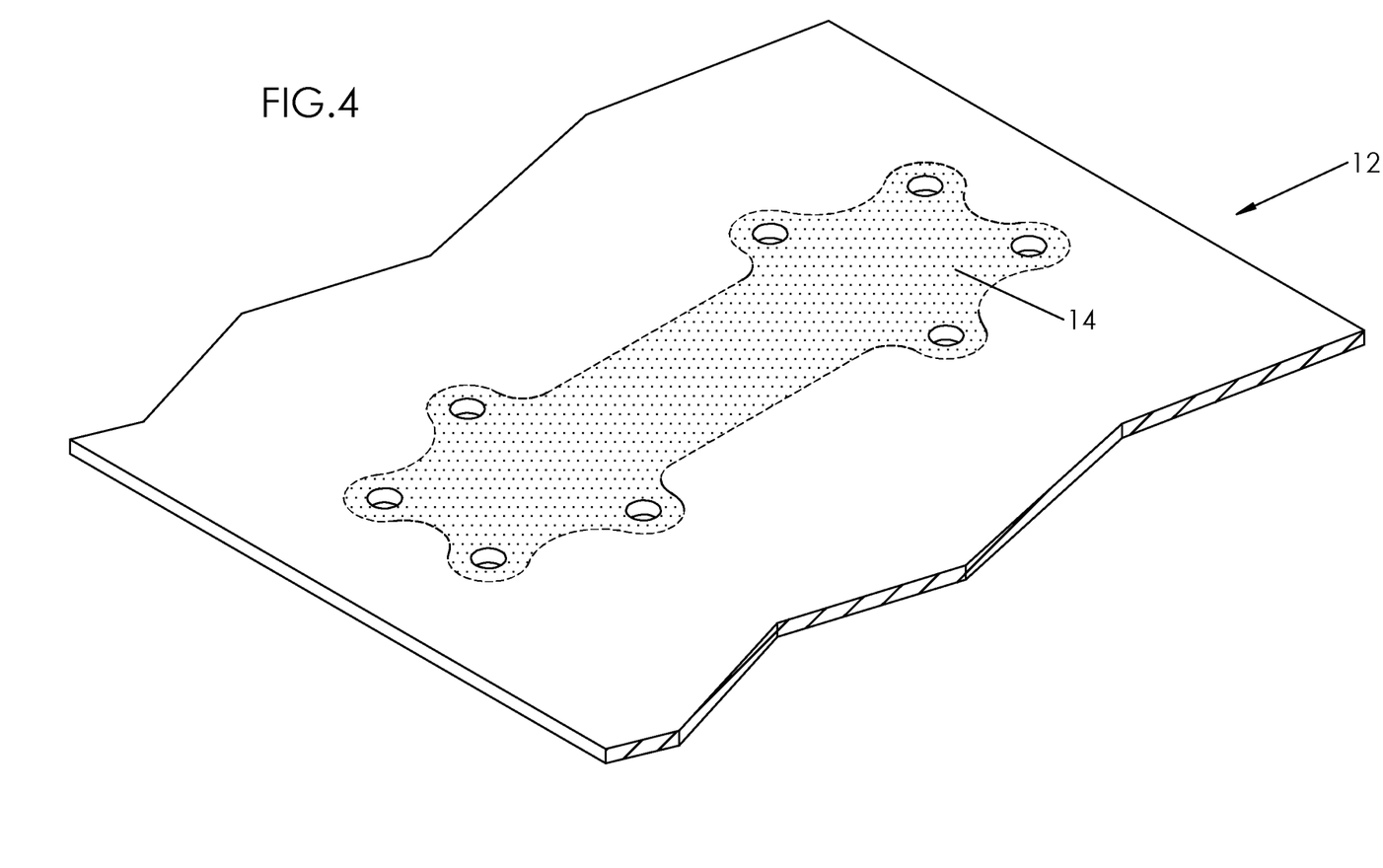
FIG. 4 shows a corroded area on the shroud of an intermediate casing.

A first step consists in dismounting the shroud 12 to detect the corroded areas 14, which is performed in a maintenance workshop (FIG. 4).

Figure 5:
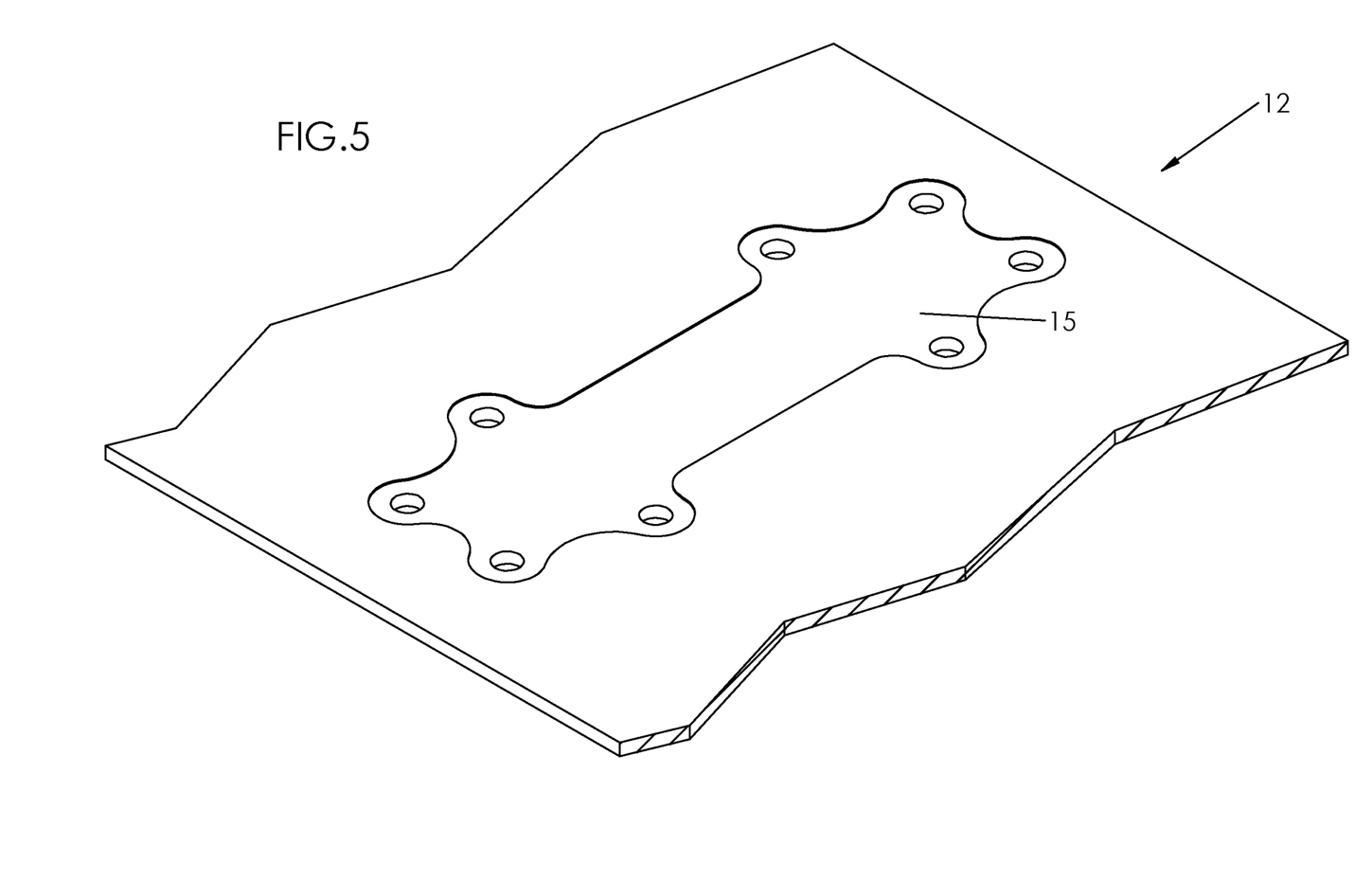
FIG. 5 shows a machined area which corresponds to a corroded area having been submitted to machining causing a loss of material.

A second step consists in machining the identified corroded areas 14, on a surface surrounding the whole area of contact between the shroud 12 and one (or more) arm(s) 11 of the casing. Selecting such a surface makes it possible to systematically eliminate the whole corrosion by machining. Machined areas 15 are then obtained as shown in FIG. 5.

Figure 6:
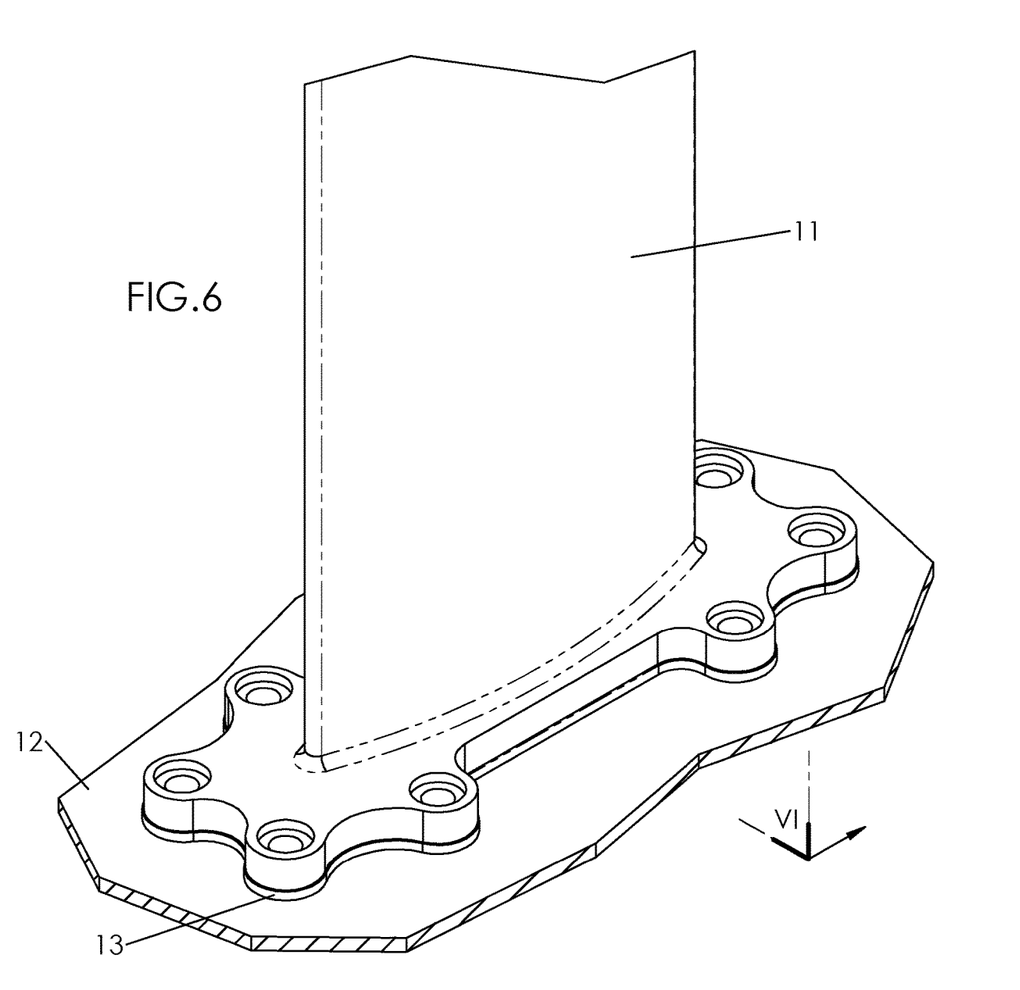
FIG. 6 is a perspective view of the binding between an intermediate casing and a shroud comprising a sealing part.

To restore the contact geometry between one arm 11 of the casing 4 and the shroud 12, a sealing part 13 is positioned at the arm/shroud interface as shown in FIG. 6.

Such sealing part 13 provides several technical functions:
it prevents the loss of contact surface at the arm 11/shroud 12 interface;
it limits the sliding between the arm 11 and the shroud 12;
it limits the appearance of corrosion at the arm 11/shroud 12 interface.

For this purpose, the sealing part 13 includes several layers having specific functions.

The layers in contact with the casing arms 11 or the shroud 12 have high coefficients of friction so as to limit the relative sliding between the arms 11 and the shroud 12 of the intermediate casing 4. Such coefficients of friction have to be within the range from 0.1 to 0.7 to support possible loads resulting from the loss of a fan blade 2.

However, such layers must have some flexibility to increase the contact surfaces while following the geometry of the two parts at the interface.

The sealing part 13 includes a metal core 16 which gives it good stiffness properties, and thus ensures a long-lasting repair.

The sealing part 13 includes a seal 17 integrated all around the profile of the arm 11/shroud 12 interface to provide a correct sealing of the binding. The aim of the seal 17 is to prevent any propagation of air from the secondary air flow B towards the inside of the nacelle 9, as shown in FIG. 1.

Figure 9:
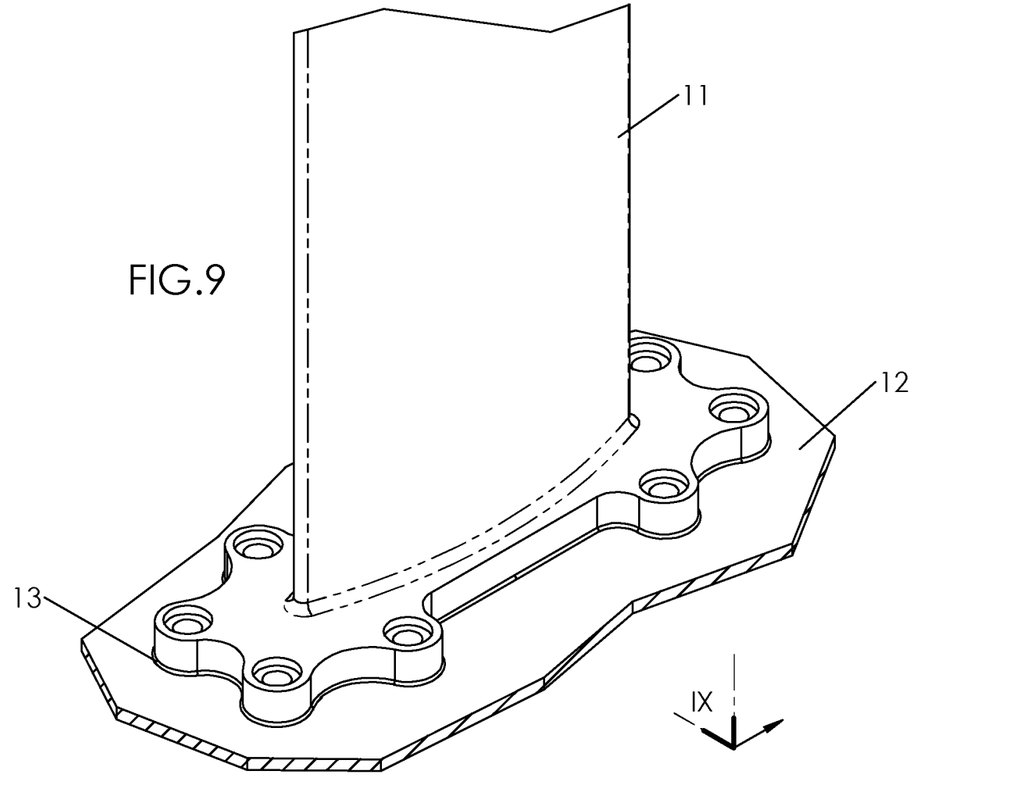
FIG. 9 is a perspective view of the binding between one arm of the intermediate casing and one shroud comprising, at the interface thereof, a sealing part including a ball seal, according to one exemplary embodiment.
Figure 10:
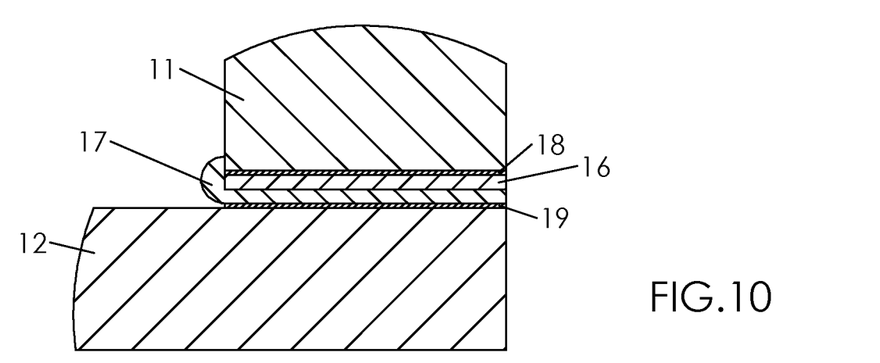
FIG. 10 is a sectional view of the binding between one arm of the intermediate casing and one shroud comprising one sealing part including a ball seal, along the cutting plan IX in FIG. 9.

According to some exemplary embodiments, various types of seals can be used, such as, for instance, an elastomer seal, a lip seal or a ball seal. An exemplary embodiment with a ball seal is shown in FIG. 9 and FIG. 10.

In order to reach a sustainable solution, it is necessary to ensure the correct tightening of the binding, in normal operation, and not to affect the behaviour of the assembly under a load resulting from the loss of a fan blade 2.

To reach an optimum tightening of the binding, the supporting surfaces between the arms 11 of the intermediate casing 4 and the shroud 12 must not be reduced. To this end, the sealing part 13 has a thickness from 1.2 mm to 1.5 mm which makes it possible to restore the relative positioning of both parts. Besides, the sealing part 13 is made of a material flexible enough to follow the contact surfaces between the arms 11 and the shroud 12.

The dimensions and flexibility of the selected materials make it possible not to reduce the supporting surfaces and, with the same clamping force, not to reduce the caulking pressure at binding.

In order to enhance the behaviour of the assembly in case a blade is lost, the contact surfaces between the shroud 12 and the arms 11 of the intermediate casing 4 must not be reduced. As a matter of fact, under a load resulting from the loss of a fan blade 2, the supporting surfaces slide relative to one another and cause the shearing of the binding screws between the arms 11 and the shroud 12. To keep a sufficient margin, the coefficients of friction of the sealing part 13 layers in contact with the arm 11 of the casing and of the layers in contact with the shroud 12 have to be calibrated.

In order to reach optimum conditions which limit the relative sliding between the two parts in case a fan blade 2 is lost, the layers in contact with the arms 11 of the casing must have a coefficient of friction from 0.1 to 0.7 and the layers in contact with the shroud 12 must have a coefficient of friction from 0.1 to 0.7.

Besides, as corrosion at the arm 11/shroud 12 interface is a frequent phenomenon, such mounting makes it possible to limit the appearance of new corrosion in the contact area. More specifically:
on the one hand, the flexibility of the sealing part 13 enables same to follow the shapes in contact;
on the other hand, the presence of a seal 17 in the part 13, surrounding the whole binding makes it possible to isolate the contact area from the outside.

This last function fulfilled by the part 13 makes it possible to stop the appearance of corrosion in the contact area between the arms 11 and the shroud 12, and substantially improves the intermediate casing 4 in this respect, once repaired, relative to the situation of the new intermediate casing 4.

Eventually, the sealing part 13 must have a low enough mass not to impact the intermediate casing 4 and thus make it possible to use the same screws as before repairing. Special attention is then paid to the geometry of the part to limit the thickness thereof, which must not exceed 1.5 mm and the mass thereof which must not exceed 80 g.

Figure 7:
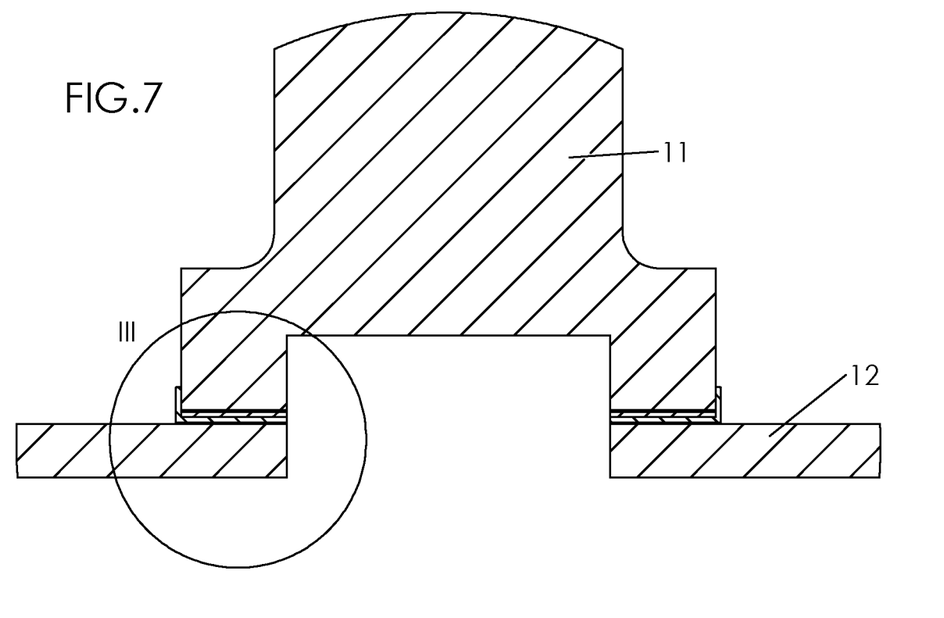
FIG. 7 is a sectional view of one area of the intermediate casing assembly comprising a sealing part according to an exemplary embodiment, along the cutting plan VI in FIG. 6.
Figure 8:
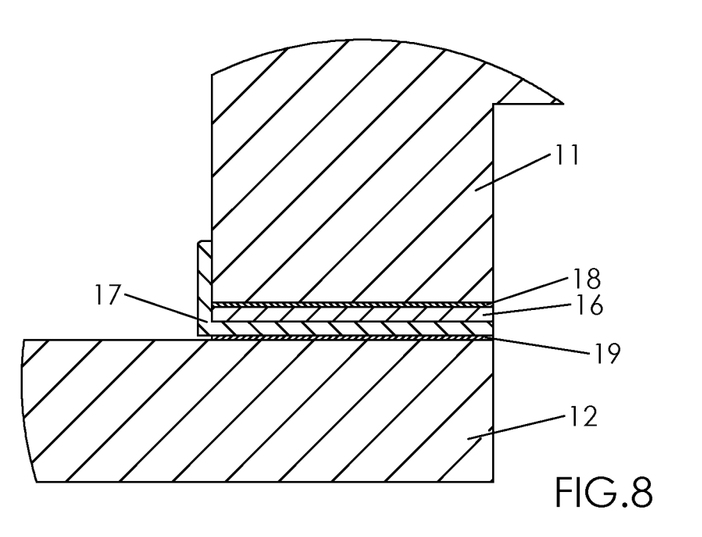
FIG. 8 is a detailed view at a larger scale, of the area III in FIG. 7, showing an exemplary embodiment.

According to one exemplary embodiment shown in FIG. 7 and FIG. 8, the sealing part 13 includes, in addition to the metal core 16 and the seal 17 an upper coating 18 in contact with the arm 11 of the intermediate casing 4 and a lower coating 19 in contact with the shroud 12. The coefficients of friction of the two coatings 18, 19 may be different: that of the upper coating 18 has to be from 0.1 to 0.7 and that of the lower coating 19 has to be from 0.1 to 0.7.

Figure 11:
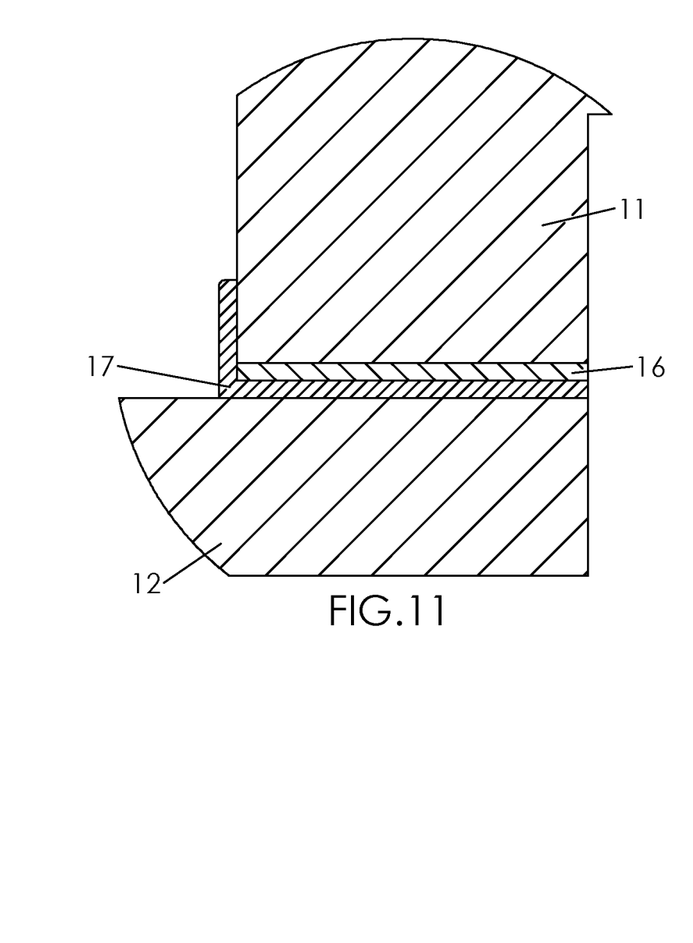
FIG. 11 is a sectional view of the binding between one arm of the intermediate casing and one shroud comprising a sealing part according to one exemplary embodiment.

According to one exemplary embodiment shown in FIG. 11, the sealing part 13 comprises a metal core 16 and a seal 17. According to another embodiment, not shown, the metal core 16 and the seal 17 may coincide.

Figure 12:
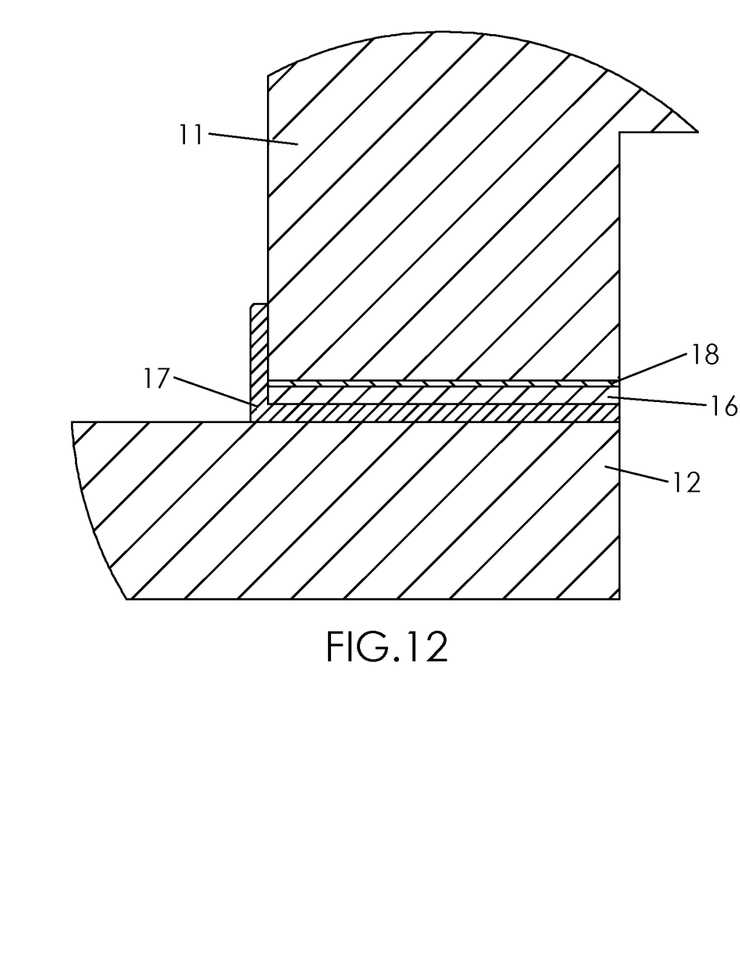
FIG. 12 is a sectional view of the binding between one arm of the intermediate casing and one shroud comprising a sealing part according to one exemplary embodiment.

According to one exemplary embodiment shown in FIG. 12, the part includes, in addition to the metal core 16 and the seal 17 an upper coating 18 in contact with the arm 11 of the intermediate casing 4. The upper coating 18 has a thickness from 20 to 100 μm and a coefficient of friction from 0.1 to 0.7.

Figure 13:
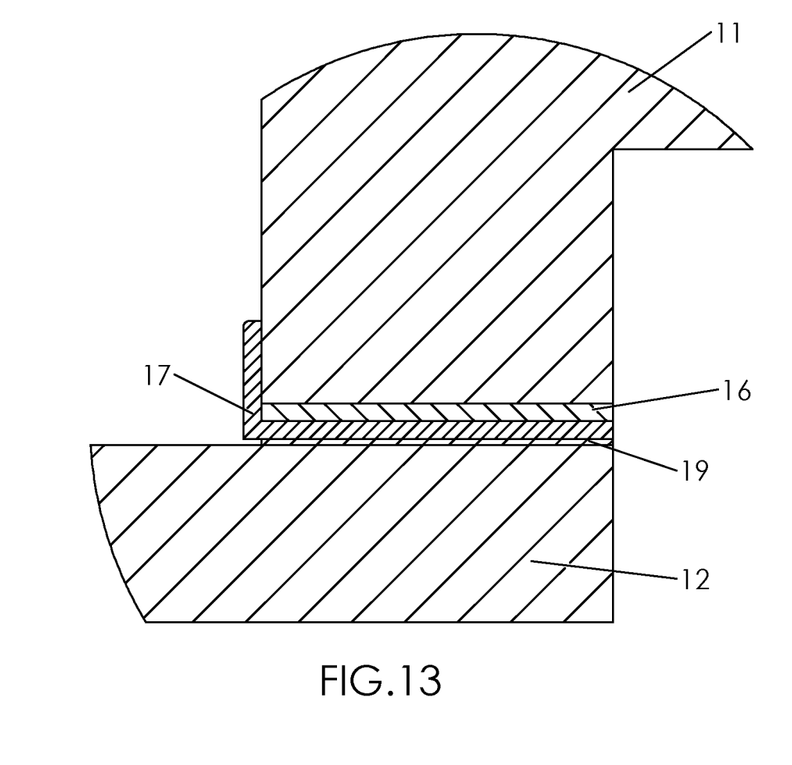
FIG. 13 is a sectional view of the binding between one arm of the intermediate casing and one shroud comprising a sealing part according to one exemplary embodiment.

According to one exemplary embodiment shown in FIG. 13, the sealing part includes, in addition to the metal core 16 and the seal 17 a lower coating 19 in contact with the shroud 12. The lower coating 19 has a thickness from 20 to 100 μm and a coefficient of friction from 0.1 to 0.7.

The invention claimed is:

1. An intermediate casing for a turbine engine, comprising at least one central hub and one shroud which are positioned concentrically, and mutually mechanically connected by structural arms, characterized in that it comprises at least one sealing part attached between the shroud and one structural arm, with the sealing part including at least one metal core and one seal, with the sealing part including an upper coating in contact with the arm and/or a lower coating in contact with the shroud; wherein the lower coating and/or the upper coating has a thickness between 20 and 100 μm and/or wherein the metal core has a thickness between 100 and 200 μm.

2. An intermediate casing for a turbine engine according to claim 1, including the upper coating, characterized in that the upper coating has a coefficient of friction from 0.1 to 0.7.

3. An intermediate casing for a turbine engine according to claim 1, including the lower coating, characterized in that the lower coating has a coefficient of friction from 0.1 to 0.7.

4. An intermediate casing for a turbine engine according to claim 1, characterized in that the metal core is made of aluminium or steel.

5. An intermediate casing for a turbine engine according to claim 1, characterized in that the seal is a lip seal or a ball seal.

6. An intermediate casing for a turbine engine according to claim 1, characterized in that the seal is an elastomer seal.

7. An intermediate casing for a turbine engine according to claim 1, characterized in that the seal has a thickness from 1.1 mm to 1.5 mm.

8. A method for repairing an intermediate casing comprising at least one central hub and one shroud which are positioned concentrically, and mutually mechanically connected by structural arms, and with the shroud showing corroded areas, with such method being characterized in that it comprises the following steps:
   dismounting of the shroud;
   identification of the corroded areas, if any;
   tracing of the profiles of the corroded areas;
   cleaning of the corroded areas on the shroud;
   machining of the corroded areas on a surface surrounding the whole area of contact between the shroud and the arm of the casing;
mounting of the intermediate casing and positioning of the sealing parts between the arms of the casing and the shroud, at the machined areas, with a binding being provided by crushing the sealing parts between the arms and the shroud, with each sealing part including an upper coating in contact with the arm and/or a lower coating in contact with the shroud.

* * * * *